Sept. 3, 1963
R. H. ARNESON
3,102,313
TERMINAL CONNECTION FOR LINE OR CORD
AND METHOD OF USING THE SAME
Filed Dec. 9, 1960
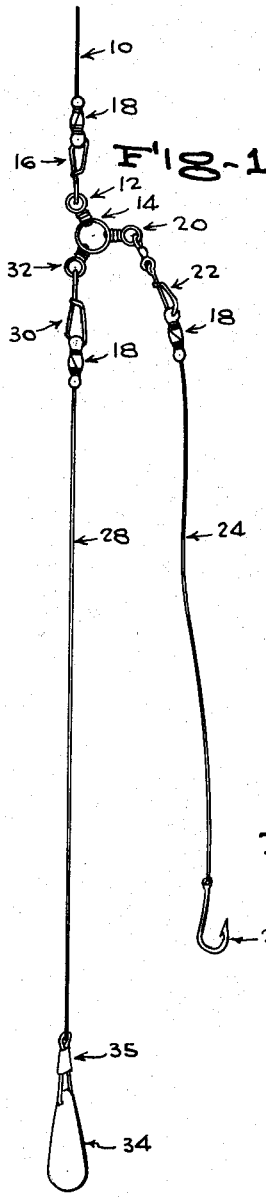
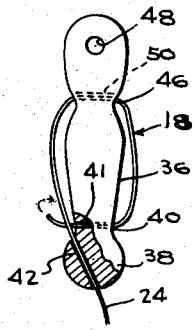
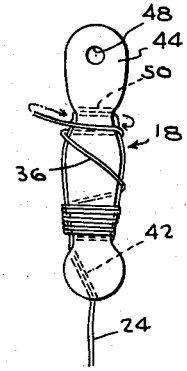
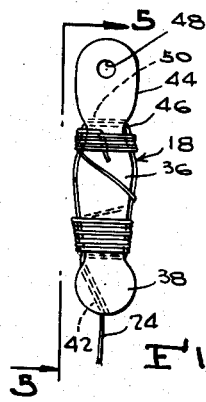
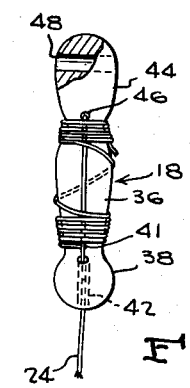
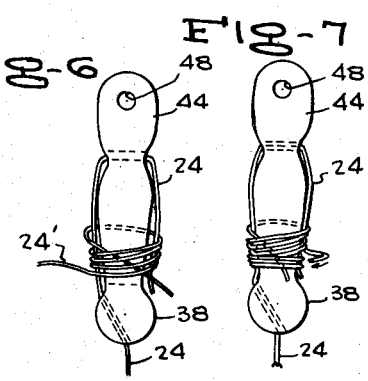
INVENTOR.
ROLF H. ARNESON
BY
McMorrow, Berman & Davidson
ATTORNEYS United States Patent Office  3,102,313
Patented Sept. 3, 1963

3,102,313
TERMINAL CONNECTION FOR LINE OR CORD AND METHOD OF USING THE SAME
Rolf H. Arneson, Morris, Minn., assignor to Rap., Inc., Morris, Minn., a corporation of Minnesota
Filed Dec. 9, 1960, Ser. No. 74,885
2 Claims. (Cl. 24—129)

This invention relates to devices for providing terminal end connections for a line, cord, and similar elongated flexible elements, and to new and novel methods for using the same.

It has long been recognized that the "knotting" of lines to connect one line with another is objectionable, and that the most desirable connection between two lines is that which is effected without a knot. Of course, to effect the connection between two lines, some type of joining means must be employed and in recent years, with the development and widespread acceptance of mono-filament lines, this problem has received much attention for despite the many advantages of the mono-filament lines or cords, the breaking strength is greatly weakened when a pair of terminal ends thereof are joined by knotting the same together. The general accepted theory as to the cause of the weakening resulting from knotting of cordage or lines, and especially of mono-filament lines, is that the severe bending of such a line necessitated by knotting, tends to weaken the structure of the line, thereby rendering the resistance of the line to breakage greatly lessened at the knotted portion.

In attempts to reduce or eliminate line breakage at the point of connection, certain complex knots have been devised, and various connectors have been invented having as their direct object the coupling of a pair of terminal ends of two lines without knotting.

The instant invention is directed to the provision of a new and novel connector for the connection of two or more mono-filament lines, one with another.

One of the primary objects of this invention is to provide a line connection device and a method of connecting at least a pair of lines thereto which is effective for this purpose, the connection being made without knotting or tying the line.

Single strand or filament line, commonly referred to as "mono-filament," has found wide acceptance in various fields due to substantial improvements in the manufacture thereof during recent years. One of the areas of usage of this material is in fishing lines, and the like, although the material has also gained wide acceptance in other arts. Accordingly, and in view of the above-noted desirability of providing a connection between two mono-filament lines without knotting or tying, it is a further object of this invention to provide a method and means for connecting a pair of terminal ends of mono-filament lines, the means being widely adaptable to various forms and arrangements of fishing appliances.

A still further object of this invention is to provide a fishing line connector of relatively small diameter which is adapted to pass easily through fishing line guides, and the like, when necessary.

This invention contemplates, as a still further object thereof, the provision of a fishing line connector which is non-complex in construction, inexpensive to manufacture, and which is durable in use.

Other and further objects and advantages of the instant invention will become more evident from a consideration of the following specification when read in conjunction with the annexed drawing, in which:

FIGURE 1 is a side elevational view of three of the mono-filament line connectors illustrating the same as being connected to a conventional three-way swivel for fishing lines;

FIGURE 2 is an enlarged side elevational view, partly broken away, of a mono-filament line connector according to this invention, FIGURE 2 illustrating one of the method steps for effecting a tie between one end of a mono-filament line and the connector;

FIGURE 3 is a side elevational view of the connector shown in FIGURE 2, FIGURE 3 illustrating still another step in the connection between one end of a mono-filament line and the connector;

FIGURE 4 is a side elevational view of the connectors shown in FIGURES 2 and 3, FIGURE 4 illustrating the completed tie and connection between the above-referred to one end of a mono-filament line and the connector;

FIGURE 5 is similar to FIGURE 4, FIGURE 5 being a side elevation of the connector and line shown in FIGURE 4, and partially broken away, FIGURE 5 being rotated about its longitudinal axis 90 degrees with respect to the showing of FIGURE 4; and FIGURES 6, 7 and 8 illustrate a second method for connecting one terminal end of a mono-filament line to the illustrated connector device.

Referring now more specifically to FIGURES 1 to 5, inclusive, of the drawing, reference numeral 10 designates a fishing line preferably, though not necessarily, formed of a single strand of flexible filament known in this art as "mono-filament." The line 10, at its outer terminal end, is connected to one swivel 12 of a three-way conventional swivel connector 14 through a conventional snap 16 and a connector 18, the latter forming the subject matter of this invention.

The line 10 is connected, through a second swivel 20 with a second snap 22 having a second connector 18 connected thereto. The second connector 18 has secured thereon one end of a leader 24, preferably formed of a mono-filament type line, and to the other end of the leader is fixedly secured a conventional hook or lure 26. Reference numeral 28 designates a short length of mono-filament line having one end thereof secured to a third connector 18, the latter being connected through a third snap 30 with the third swivel 32 of the three-way swivel 14. The other end of the line 28 is connected to a weight 34 by means of a safety snap 35.

With the exception of the connectors 18, all other elements described above are old and well-known in this art, and the same do not form or comprise any part of this invention.

Each of the connectors 18, to which this invention is directed, is formed of an opaque, translucent or transparent material formed of plastic materials, such as, for example, wood plastics or the same may be formed of metal or plastic-metallic materials, and each of the connectors 18 includes an elongated ovate solid central bight portion 36, which, in transverse cross-section, has a circular configuration. As is seen in the several figures of the drawing, the narrowest end of the central body portion 36 is integral with a spherical member 38 having a diameter substantially equal to the greatest diameter of the central body portion and forms a neck 40 of lesser diameter at the line of juncture therebetween. The spherical member 38 and the central body portion 36 are coaxial. A passage 42 is formed in the spherical body 38, the passage 42 being at an acute angle with respect to the above-referred to axis, and extends inwardly from the outermost end of the spherical body 38 to open, at its other end, in the surface thereof, at a point immediately adjacent the neck 40.

A second passage 41 extends diametrically through the neck 40 perpendicular to the longitudinal axis of the connector 18.

The central body portion 36 is integrally formed, adjacent its wider end with a flat lug-type head 44, and it should be here noted that the junction therebetween includes a neck 46 having a diameter less than the diameter of the widest portion of the central body portion 36 and is substantially equal to the diameter of the neck 40. The head 44 is formed with a transversely-extending opening 48 which receives, as shown in the drawing, the bight portion of one of the snaps 16, 22, or 30. A passage 50 extends transversely through the neck 46 perpendicular to the longitudinal axis of the connector 18 and is substantially parallel to the passage 41. The passage 50 must be slightly above the neck 46 or the connector 18 will not serve its respective functions.

The mono-filament lines 10, 24 and 28, in this first embodiment of the invention, have one of their terminal ends connected to one of the connectors 18 in the following manner.

A free end of one of the lines, for example, line 24, is passed inwardly through the lower end of the passage 42, as viewed in FIGURES 2 to 5, inclusive, and toward the central body portion 36. The free end of the line 24 is then passed through the passage 50 and next through the passage 41. The free end of the line 24 passes behind (see FIGURE 2 of the drawing) that end portion of the line 24 which projects through the passage 42 and is wrapped around the main body portion 36 and line 24 in a plurality of convolutions which begin at the neck 40 and spiral upwardly about the central body portion 36. This wrapping continues upwardly of the central body portion 36, but terminates below that portion thereof having the largest diameter. As is seen in FIGURE 3, after this wrapping has been completed, the free end of the line 24 is extended spirally and upwardly from the neck 40 to and toward the neck 46. Again referring to FIGURE 3 of the drawing, the free end of the line 24 is wrapped around the central body portion 36 in mounting convolutions until the convolutions approach the passage 50 at which time the free end is passed downwardly (see FIGURE 4) under the last-named convolutions to form what is commonly known as a "whip" end.

It should be obvious from the foregoing description and with reference to the drawing, that any tension applied to the leader or line 24, and assuming that the connector 18 is connected to the three-way swival in the manner shown in FIGURE 1, will cause the convolutions to tighten about the central body portion 36 whereby the terminal end or the free end of the "whip" winding is more tightly clamped against the main body portion 36.

FIGURES 6 to 8, inclusive, illustrate a second embodiment of this invention. It will be understood that the same type of connectors 18 are employed in this second modification, and that the same differs from the first embodiment only in the method employed in connecting the mono-filament line 24 (10 or 28) to the connector 18.

In this second embodiment of the invention, the free end of one of the lines 10, 24 or 28, and here again, we select the line 24 for the purpose of illustration, is passed, as before, through the passage 42 and the passage 50. The free end of the line 24 is then brought downwardly from the passage 50 to a position proximate the spherical body 38. Thereafter, a short length of the mono-filament line 24', as viewed in FIGURE 6, is started in an upwardly-spiraled configuration around the diametrically-opposed portions of the line 24 which now lie adjacent the central body portion 36. As is seen in FIGURE 6, the line 24' starts at a point adjacent the passage 41 and extends upwardly to a point proximate, but spaced from the maximum diameter of the central body portion 36. After completing one upward convolution, the length of line 24' is wrapped downwardly to, but not past the passage 41, after which the convolutions are wrapped upwardly to overlap the previous convolutions and to extend upwardly across the central body portion 36 and the diametrically-opposed portions of the line 24 laying proximate thereto. The wrapping of the length of line 24 continues until the same covers the central body portion 36 to a point approaching the passage 50, at which time the length of line 24' is given a "whip" end.

It is obvious that tension on the line 24 will effect a slight shifting of the convolutions of the length of line 24' upwardly of the central body portion 36, as viewed in FIGURES 6 to 8, inclusive, from approximately the passage 41 to and toward the maximum diameter of the central body portion 36, and since the diameter of the central body portion 36 increases progressively in this direction, the convolutions will tighten against the main body portion and the diametrically-opposed free end portions of the line 24. This tension serves to hold the free end portions of the line 24 more tightly against the central body portion 36 of the connector 18, thereby preventing its disconnection therefrom.

The shape of the head 44 is not critical, and it may be flat, as shown, round, rectangular, or of any other desired configuration. However, the position of the passage 50 is most critical, since it must be spaced away from the neck 46 a very short distance toward the head 44. The connectors 18 may vary in length and width, depending upon the size of the line to be connected thereto, and it is, therefore, impossible to locate the passage 50 with respect to the neck 46 in definitive terms. It must, however, be spaced slightly above the neck 46, reference being made to FIGURES 2 to 8, inclusive, of the drawing.

Having described and illustrated several embodiments of this invention, in detail, it will be understood that the same is offered only by way of example, and that this invention is to be limited only by the scope of the appended claims.

What is claimed is:

1. An article of manufacture comprising an elongated substantially ovate central body portion, a head projecting axially from that end of said central body portion having the greatest diameter, a spherical member rigidly connected to the other or narrower end of said central body portion, the junctions of said head and said spherical member with said central body portion forming a neck, respectively, therebetween, said necks having first and second passages, respectively, extending transversely therethrough, said passages being substantially parallel with respect to one another and being perpendicular to the longitudinal axis of said central body portion, said spherical member having a passage extending therethrough, said last-named passage being disposed at an acute angle with respect to said longitudinal axis of said central body portion, said last-named passage having an end thereof opening into the surface of said spherical member proximate said first passage formed in the adjacent neck, the other end of said last-named angularly-disposed passage opening into the surface of said spherical member substantially on the longitudinal axis of said central body portion, said second passage being disposed immediately adjacent the other of said necks and spaced longitudinally away from said central body portion, and said head having an opening extending transversely therethrough.

2. A connector for a cord or line, said connector comprising an elongated ovate central body portion, a head projecting longitudinally away from that end of said central body portion having the maximum diameter, said head having a first passage extending transversely therethrough perpendicular to the longitudinal axis of said cylindrical body portion, the junction between said head and said central body portion forming a first neck having a second passage extending transversely therethrough, said second passage being disposed perpendicularly to said longitudinal axis and perpendicularly with respect to the longitudinal axis of said first passage, said central body portion making junction at its other end in a spherical member, a third passage extending transversely through the last-named junction, said third passage being parallel to said second passage, and a fourth passage extending transversely through said spherical member at an acute angle with respect to said longitudinal axis of said central body portion, said fourth passage opening at one of its ends in said spherical member adjacent one end of said third passage, and the other end of said fourth passage opening through said spherical member adjacent its outermost end.

References Cited in the file of this patent

UNITED STATES PATENTS

| | | |
|---|---|---|
| 114,119 | England | Apr. 25, 1871 |
| 741,154 | Meyer | Oct. 13, 1903 |
| 783,743 | D'Olier | Feb. 28, 1905 |
| 879,941 | Botkin | Feb. 25, 1908 |
| 1,774,898 | Novick | Sept. 2, 1930 |
| 2,422,358 | Lohl | June 17, 1947 |
| 2,595,806 | Morris | May 6, 1952 |
| 2,646,298 | Leary | July 21, 1953 |
| 2,781,568 | Graham | Feb. 19, 1957 |
| 2,932,072 | Pruchnow | Apr. 12, 1960 |

FOREIGN PATENTS

| | | |
|---|---|---|
| 612,628 | Great Britain | Nov. 16, 1948 |